United States Patent
Jung et al.

(10) Patent No.: US 10,338,644 B2
(45) Date of Patent: Jul. 2, 2019

(54) DISPLAY DEVICE

(71) Applicant: LG DISPLAY CO., LTD., Seoul (KR)

(72) Inventors: Ilchan Jung, Wonju-si (KR); Moojin Kim, Ulsan (KR)

(73) Assignee: LG DISPLAY CO., LTD., Seoul (KR)

( * ) Notice: Subject to any disclaimer, the term of this patent is extended or adjusted under 35 U.S.C. 154(b) by 61 days.

(21) Appl. No.: 15/142,635

(22) Filed: Apr. 29, 2016

(65) Prior Publication Data

US 2017/0068287 A1 Mar. 9, 2017

(30) Foreign Application Priority Data

Sep. 9, 2015 (KR) .......................... 10-2015-0127738

(51) Int. Cl.
| | |
|---|---|
| G06F 1/16 | (2006.01) |
| H04N 5/225 | (2006.01) |
| G02B 1/11 | (2015.01) |
| G02B 1/111 | (2015.01) |
| G03B 11/00 | (2006.01) |

(52) U.S. Cl.
CPC .............. *G06F 1/1686* (2013.01); *G02B 1/11* (2013.01); *G02B 1/111* (2013.01); *G06F 1/1605* (2013.01); *G06F 1/1637* (2013.01); *H04N 5/2252* (2013.01); *H04N 5/2257* (2013.01); *G03B 11/00* (2013.01)

(58) Field of Classification Search
CPC .. H05K 5/0017; G06F 1/1605; H04N 5/2257; G02B 1/11; G02B 1/111; G02F 1/133502; G03B 11/00
See application file for complete search history.

(56) References Cited

U.S. PATENT DOCUMENTS

| | | | | |
|---|---|---|---|---|
| 6,110,595 | A * | 8/2000 | Suzuki | .................... G02B 1/111 428/327 |
| 2002/0154379 | A1* | 10/2002 | Tonar | ................... B60Q 1/2665 359/267 |
| 2010/0315570 | A1 | 12/2010 | Mathew et al. | |
| 2012/0243091 | A1 | 9/2012 | Amm et al. | |
| 2014/0147667 | A1* | 5/2014 | Determan | ................ C09J 7/243 428/354 |

(Continued)

FOREIGN PATENT DOCUMENTS

| | | |
|---|---|---|
| CN | 102015945 A | 4/2011 |
| CN | 102662302 A | 9/2012 |
| CN | 202889484 U | 4/2013 |

(Continued)

OTHER PUBLICATIONS

Author Unknown, "Anti-Reflective Coating," Wikipedia, XP055335841, Retrieved from the Internet URL:https://en.wikipedia.org/wiki/Anti-reflective_coating, May 2, 2015, pp. 1-8.

*Primary Examiner* — Michael H Caley
*Assistant Examiner* — Jonathan Y Jung
(74) *Attorney, Agent, or Firm* — Birch, Stewart, Kolasch & Birch, LLP (57) ABSTRACT

A display device having a minimal overall thickness is achieved by receiving a camera in an accommodation space on at least one among upper and lower substrates. The optical affects caused by reflection of light off the camera or its components can be minimized by a special low reflective film provided in the accommodation space.

12 Claims, 7 Drawing Sheets

(56) References Cited

U.S. PATENT DOCUMENTS

2014/0225131 A1* 8/2014 Benson ................ G06F 1/1643
 257/82

FOREIGN PATENT DOCUMENTS

| CN | 203773511 U | * | 8/2014 |
| CN | 203773511 U | * | 8/2014 |
| EP | 2448243 A2 | | 5/2012 |
| JP | 2011-203345 A | | 10/2011 |
| TW | 201447428 A | | 12/2014 |

* cited by examiner

DISPLAY DEVICE

CROSS-REFERENCE TO RELATED APPLICATIONS

This application claims the priority of Korean Patent Application No. 10-2015-0127738 filed on Sep. 9, 2015, in the Korean Intellectual Property Office, the disclosure of which is incorporated herein by reference.

BACKGROUND

Technical Field

The present disclosure relates to a display device and more specifically to a display device that minimizes glittering caused by a camera and reduces the overall thickness of the display device.

Description of the Related Art

As information technology has developed, display devices that represent information contained in electrical signals in the form of visual images are in widespread use. In accordance with this, research is ongoing into various display panels that can be implemented in devices which are thinner, lighter and consume less power. Exemplary display devices include plasma display panels (PDP), field emission displays (FED), organic light-emitting displays (OLED), liquid crystal displays (LCD), and the like.

In particular, as displays are recently employed by a variety of mobile terminals such as laptop computers, smart phones and tablet PCs, it is also important to develop display devices with product designs that are more appealing to users, in addition to providing enhanced performance.

In addition, display devices with a camera embedded in the front and/or rear surface for video chatting or video conferencing have been released. In the existing display devices, a camera is disposed in a separate component such as a cover or housing surrounding the display screen. This results in the increased bezel width of display devices, and the level difference (i.e., step or unevenness) between the display screen and the cover is created. Accordingly, this hinders various innovative designs that could be implemented for display devices.

In order to overcome the above-mentioned problems, i.e., to reduce the width of the bezel and to eliminate the level difference, it has been proposed to dispose a camera under the panel of a display device. An example of a display device with a camera disposed under the panel will be described with reference to FIGS. 1A and 1B.

Figure 1A:
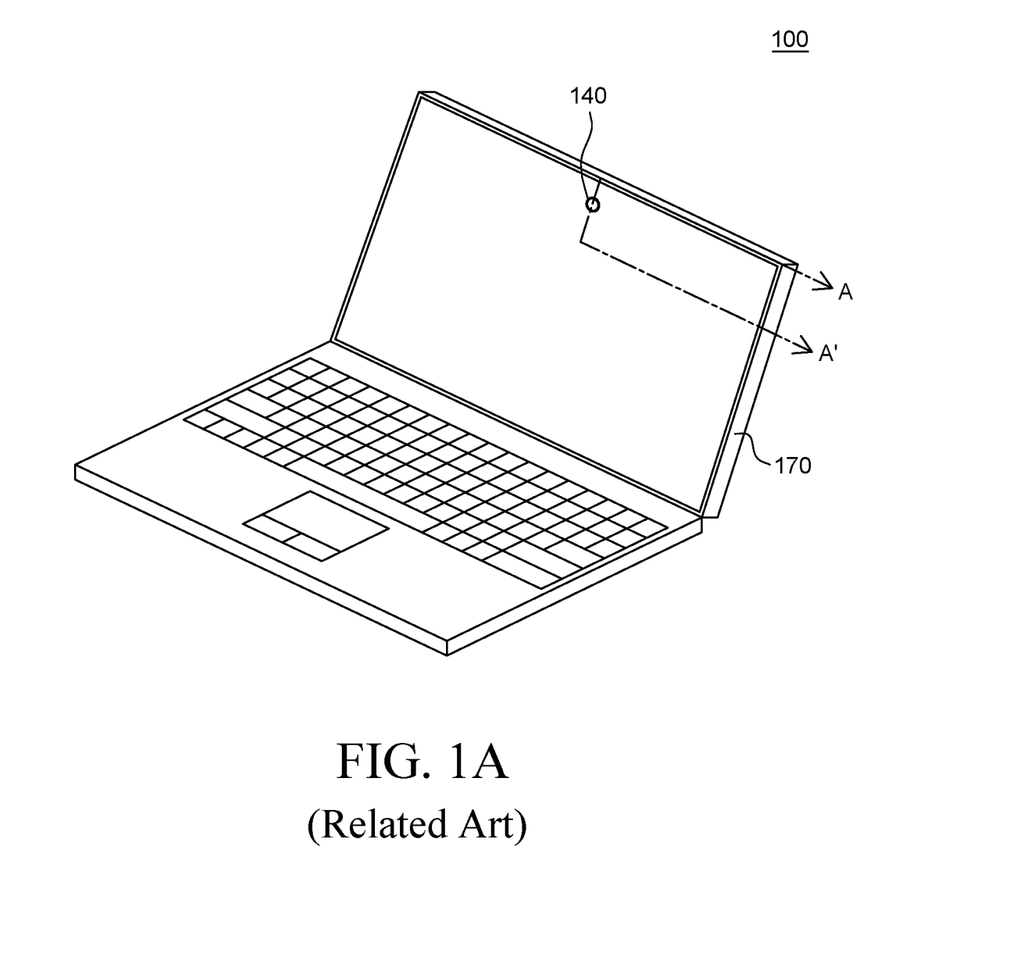
FIG. 1A is a perspective view of a laptop computer employing an existing display device according to a related art.
Figure 1B:
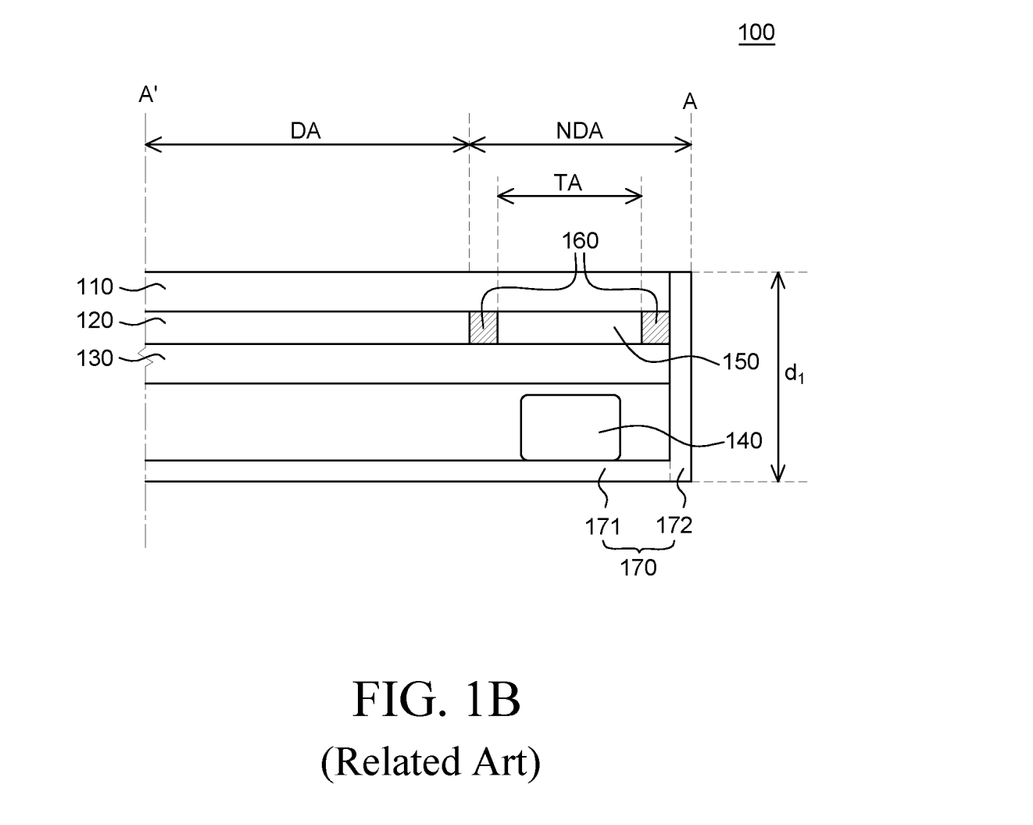
FIG. 1B is a cross-sectional view taken along line A-A' shown in FIG. 1A according to the related art.

FIG. 1A is a perspective view of a laptop computer employing an existing display device according to a related art. FIG. 1B is a cross-sectional view taken along line A-A' shown in FIG. 1A. Referring to FIGS. 1A and 1B, a display device 100 includes an upper substrate 110, a lower substrate 130, and a display element 120 between the upper and lower substrates 110 and 130. A camera 140 is disposed under the lower substrate 130.

The display device 100 includes a display area DA where an image is displayed, and a non-display area NDA surrounding the display area DA, where no image is displayed. The display element 120 that emits light is disposed between the upper substrate 110 and the lower substrate 130 in the display area DA. In the non-display area NDA, a black matrix 160 is disposed between the upper substrate 110 and the lower substrate 130. The black matrix 160 is disposed in the non-display area NDA along the edge of the display area DA. Apart of the non-display area NDA above the camera 140 is defined as a transparent area TA. The black matrix 160 is not disposed in the transparent area TA such that the camera 140 is not obstructed. In the transparent area TA, an additional adhesive layer 150 is disposed between the upper substrate 110 and the lower substrate 130. The upper substrate 110, the lower substrate 130, the display element 120 and the camera 140 are fixed to a plurality of frames 170 including a lower frame 171 and a side frame 172.

As shown in FIG. 1B, the camera 140 is fixed to the frames 170 and is disposed below the lower substrate 130 in the non-display area NDA. Since the camera 140, which has a relatively large size, is disposed below the lower substrate 130, the overall thickness of the display device 100 increases. In addition, the present inventors have realized that light coming through the transparent area TA can be reflected off certain components related to the camera 140, such as its protective cover, its lens or other optical elements, the hole or opening of the camera, etc. and thus the user may perceive glittering (or similar effects) at particular view angles and/or other optical related disadvantages may occur.

SUMMARY

To overcome or minimize such problems associated with the related art, the present inventors have devised a display device with a reduced thickness by way of disposing the camera such that at least a portion thereof is inserted in or otherwise positioned into at least a part of the lower substrate.

Further, as a way of minimizing glittering or other undesired optical affects, the present inventors have considered coating a low reflective material, but have found that it is difficult to coat the low reflective material onto the camera and/or onto the bottom surface of the lower substrate. That is, the portion where the camera is to be disposed is very narrow, and thus it is difficult to coat a low reflective material only within such narrow portion. To cope with this, the inventors have developed a tape-type low reflective film that is attachable, and have devised a display device capable of reducing glittering at a particular view angle in the transparent area by disposing the low reflective film above the camera.

An aspect of the present disclosure is to provide a display device capable of reducing the thickness byway of forming an accommodation space in a lower substrate or an upper substrate such that a camera is inserted thereinto.

Another aspect of the present disclosure is to provide a display device capable of minimizing glittering at a particular angle due to light being reflected off the camera.

Another aspect of the present disclosure is to provide a display device with a bezel that is narrower than that produced by a method of forming a low reflective material by coating, by way of disposing a low reflective film capable of reducing the reflection of light easily in a narrow space without decreasing optical properties in the transparent area such as transmittance ratio.

It should be noted that aspects of the present disclosure are not limited to the matters described above, and other aspects of the present disclosure will be apparent to those skilled in the art from the following descriptions.

To achieve these aspects, a display device according to the embodiment of the present disclosure comprises a lower substrate, and an upper substrate above the lower substrate. The lower substrate has an accommodation space at a bottom surface thereof in a non-display area, the accommodation space configured to receive at least a portion of a camera therein. The upper substrate has a transparent area corresponding to the accommodation space of the lower substrate. And a low reflective film is provided in the accommodation space to minimize glittering effects caused by light reflections caused by the camera.

Another embodiment of the present disclosure provides a display device including a lower substrate having a recess in a non-display area, an upper substrate on the lower substrate, an anti-reflective film including a transparent adhesive layer attached to the upper substrate or the lower substrate in the recess at the lower substrate and a low reflective layer disposed under the transparent adhesive layer and a camera at least partially inserted in the recess at the lower substrate and under the anti-reflective film.

Another embodiment of the present disclosure provides a display device including a lower substrate having an accommodation space in a non-display area, an upper substrate on the lower substrate, a low reflective film including a transparent adhesive layer attached to the upper substrate or the lower substrate in the accommodation space in the lower substrate and a low reflective layer disposed under the transparent adhesive layer and a camera at least partially inserted in the accommodation space in the lower substrate and disposed below the low reflective film. The display device can dispose a low reflective film in a narrow accommodation space, such that glittering possibly occurring at a particular viewing angle can be minimized.

Further, according to another embodiment of the present disclosure, the thickness of a display device can be reduced by inserting a camera in an accommodation space recessed from a bottom surface of a lower substrate, thereby improving the design of the display device.

Further, according to another embodiment of the present disclosure, a tape-type low reflective film is employed such that it can be easily attached even in a narrow accommodation space, thereby minimizing glittering from a camera.

It should be noted that exemplary effects of the present disclosure are not limited to those described above and other effects of the present disclosure will be apparent to those skilled in the art from the following descriptions.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Advantages and features of the present disclosure and methods to achieve them will become apparent from the descriptions of exemplary embodiments hereinbelow with reference to the accompanying drawings. However, the present disclosure is not limited to exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims.

The figures, dimensions, ratios, angles, the numbers of elements given in the drawings are merely illustrative and are not limiting. Like reference numerals denote like elements throughout the descriptions. Further, descriptions on well-known technologies may be omitted in order not to obscure the gist of the present disclosure. It is to be noted that the terms "comprising," "having," "including" and so on, used in the description and claims, should not be interpreted as being restricted to the means listed thereafter unless specifically stated otherwise. Where an indefinite or definite article is used when referring to a singular noun, e.g., "a," "an," "the," this includes a plural of that noun unless specifically stated otherwise.

In describing elements, they are interpreted as including error margins even without explicit statements.

In describing positional relationship, such as "an element A on an element B," "an element A above an element B," "an element A below an element $B_i$," and "an element A next to an element B," another element C may be disposed between the elements A and B unless the term "directly" or "immediately" is explicitly used.

As used herein, a phrase "an element A on an element B" refers to that the element A may be disposed directly on the element B and/or the element A may be disposed indirectly on the element B via another element C.

The terms first, second and the like in the descriptions and in the claims are used for distinguishing between similar elements and not necessarily for describing a sequential or chronological order. These terms are used to merely distinguish one element from another. Accordingly, as used herein, a first element may be a second element within the technical idea of the present disclosure.

Like reference numerals denote like elements throughout the descriptions.

The drawings are not to scale and the relative dimensions of various elements in the drawings are depicted schematically and not necessarily to scale.

Features of various exemplary embodiments of the present disclosure may be combined partially or totally. As will be clearly appreciated by those skilled in the art, technically various interactions and operations are possible. Various exemplary embodiments can be practiced individually or in combination.

Hereinafter, exemplary embodiments of the present disclosure will be described in detail with reference to the accompanying drawings.

Figure 2:
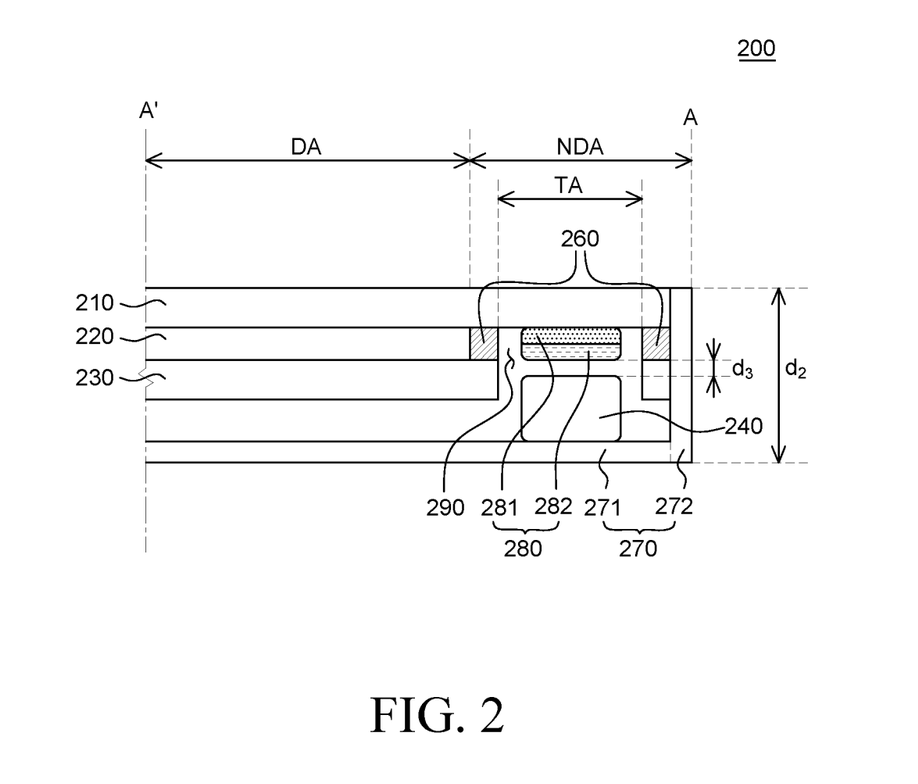
FIG. 2 is a cross-sectional view for illustrating a display device according to an exemplary embodiment of the present disclosure.

FIG. 2 is a cross-sectional view for illustrating a display device according to an exemplary embodiment of the present disclosure. Specifically, FIG. 2 is a view illustrating a cross-section taken along a line of the display device, similar to the line A-A' shown in FIG. 1A. Referring to FIG. 2, a display device 200 includes an upper substrate 210, a display element 220, a lower substrate 230, a black matrix 260, a low reflective (or anti-reflective) film 280, a camera 240 and a frame 270. All the components of the display device according to all embodiments of the present disclosure are operatively coupled and configured.

A variety of display panels and related components may be employed as the display device 200 as long as they include a camera 240 or other image capturing device (s) operatively connected with elements capable of displaying images. For example, the display device 200 may be an LCD device, an electrophoretic display device, an OLED device, or the like. In the following description, it is assumed that the display device 200 is an LCD device merely for the sake of convenience, but is not limited thereto.

In addition, the display device 200 may be applied to a variety of electronic devices. For example, the display device 200 may be, but is not limited to, one of a variety of electronic devices such as a laptop computer, a smartphone, a tablet PC, etc. In the following description, it is assumed that the display device 200 is a laptop computer but is not limited thereto.

Referring to FIG. 2, the display device 200 includes a display area DA where an image is displayed, and a non-display area NDA surrounding the display area DA, where no image is displayed. The non-display area NDA includes a transparent area TA where a camera 240 is disposed such that the camera 240 can capture images. The transparent area TA permits light to pass to thus allow the camera 240 to capture images.

The display device 200 includes two substrates 210 and 230. The display element 220 is disposed between the two substrates 210 and 230. One of the two substrates 210 and 230, in example, the upper substrate 210 may be a substrate where images are actually displayed.

In this exemplary embodiment, the lower substrate 230 may be a base structure of an array substrate. A plurality of pixels are defined on the lower substrate 230, and the pixels may include a plurality of pixel electrodes, a common electrode, a plurality of thin film transistors (TFTs) each electrically connected to the respective pixel electrodes, etc.

In this exemplary embodiment, the upper substrate 210 may be a base structure of a color filter substrate. A color filter layer that performs color filtering for the display device 200 can be formed on the upper substrate 210.

Referring to FIG. 2, a display element 220 is disposed between the lower substrate 230 and the upper substrate 210 in the display area DA. In the case that the display device 200 is an LCD device as described above, the display element 220 is a liquid crystal layer. Specifically, a sealant may be disposed to surround and fill the boundary gap between the upper substrate 210 and the lower substrate 230 in the display area DA to attach the upper substrate 210 to the lower substrate 230. A central space defined by the upper substrate 210, the lower substrate 230 and the sealant is filled with liquid crystals to form the display element 220. In the case that the display device 200 is an OLED device, the display element 220 may be an organic light-emitting element. However, the display element 220 is not limited to those mentioned above but may be variously determined depending on the type of the display device 200.

In the case that the display device 200 is an LCD device as described above, a backlight unit including a light source, an optical sheet, a reflective sheet, a light-guide plate, etc., may be disposed below the lower substrate 230 in the display area DA.

Referring to FIG. 2, the black matrix 260 is disposed between the upper substrate 210 and the lower substrate 230 in the non-display area NDA. Specifically, the black matrix 260 is disposed in the non-display area NDA, except the transparent area TA at the upper substrate 210 and the lower substrate 230. As described above, in the transparent area TA of the non-display area NDA, the camera 240 is disposed to capture images, and thus the black matrix 260 is not disposed in the transparent area TA to avoid obstruction of the camera 240.

The frame 270 houses elements of the display device 200. The frame 270 includes a lower frame 271 and a side frame 272. The lower frame 271 protects the bottom surface of the display device 200. The side frame 272 is extended vertically from the lower frame 271 to define a housing space. The side frame 272 surrounds the side surfaces of the upper substrate 210 and the lower substrate 230.

The lower substrate 230 has an accommodation space 290 in the non-display area NDA. Specifically, the lower substrate 230 has the accommodation space 290 in the transparent area TA. The upper substrate 210 has a transparent area TA corresponding to the accommodation space of the lower substrate 230. The accommodation space 290 may be a hole penetrating the lower substrate 230. More specifically, referring to FIG. 2, a hole that completely penetrates the lower substrate 230 is formed in the portion of the lower substrate 230 in the transparent area TA where the camera 240 is to be disposed, such that the accommodation space 290 in a recessed shape is defined from the bottom surface of the lower substrate 230 to the bottom surface of the upper substrate 210. The camera 240 is disposed in the accommodation space 290 recessed from the bottom surface of the lower substrate 230 toward the upper substrate 210.

The accommodation space 290 refers to the opening in the lower substrate 230 in the non-display area NDA, in which at least part of the camera 240 is inserted. The accommodation space 290 reduces the thickness of the display device 200 by accommodating at least a portion of the camera 240 therein. Accordingly, the overall thickness $d_2$ of the display device 200 can be reduced by the length of the part of the camera 240 inserted in the accommodation space 290, compared to existing display devices where a camera is disposed under the lower substrate, which results in a greater overall thickness. As a result, the thickness $d_2$ of the display device 200 according to the exemplary embodiment of the present disclosure shown in FIG. 2 is smaller than the thickness $d_1$ of the existing display device 100 shown in FIG. 1B. Accordingly, the display device 200 according to the exemplary embodiment of the present disclosure can have a slimmer design.

The accommodation space 290 may be formed by any of methods for forming a space having a recessed shape from the bottom surface of the lower substrate 230. For example, the accommodation space 290 may be formed by using a chemical etching method or a physical etching method to selectively remove a part of the lower substrate 230 in the transparent area TA. Alternatively, the accommodation space 290 may be formed by using a mechanical method, for example, by punching or otherwise cutting to selectively remove a part of the lower substrate 230 in the transparent area TA.

The accommodation space 290 may be formed in a variety of shapes depending on the design or the shape of the camera 240 to be disposed. The accommodation space 290 may be designed such that it has the same width or diameter as that of the camera 240, and accordingly there is no gap between the side surfaces of the accommodation space 290 and the side surfaces of the camera 240. Alternatively, the accommodation space 290 may be designed such that it has a larger width or diameter than that of the camera 240, and accordingly there is a gap between the side surfaces of the accommodation space 290 and the side surfaces of the camera 240. However, it is desired that the accommodation space 290 has the same width or diameter as the camera 240 in order to fix the camera 240 and increase the durability of the display device 200. Alternatively, the accommodation space 290 may have a sufficiently large width or diameter such that the camera 240 can be easily inserted in the accommodation space 290 during a manufacturing process. If a gap or space is present, such may be filled with appropriate material.

Referring to FIG. 2, a low reflective (or anti-reflective) film 280 is attached in the accommodation space to minimize glittering caused when light is reflected off the camera 240 or parts thereof. The low reflective film 280 is attached to the bottom surface of the upper substrate 210 and is disposed between the upper substrate 210 and the camera 240.

Referring to FIG. 2, the low reflective film 280 includes a transparent adhesive layer (or transparent adhesive) 281 and a low reflective layer 282. As the low reflective film 280 includes the transparent adhesive layer 281 to attach the low reflective layer 282 to the upper substrate 210, i.e., the low reflective film 280 is of a tape-type film, it is not formed by a coating process. In the display device 200 shown in FIG. 2, the low reflective film 280 has a width smaller than the top surface of the accommodation space 290. However, the size of the low reflective film 280 attached in the accommodation space 290 may be adjusted depending on device specifications. For example, the width of the low reflective film 280 may be equal to the width of the accommodation space 290.

The transparent adhesive layer 281 may be configured to allow adhesion with at least one among the upper substrate 210 or the lower substrate 230, maximizing for the transmittance ratio with respect to the transparent area TA above the camera 240. Specifically, the transparent adhesive layer 281 works as an adhesive to attach the low reflective film 280 to the bottom surface of the upper substrate 210.

The transparent adhesive layer 281 is made of an optically clear adhesive (OCA) having good optical properties including transmittance ratio. Previously, the adhesive layer of a low reflective film has been made of a pressure sensitive adhesive (PSA), which has poor optical properties. Accordingly, if such a pressure sensitive adhesive (PSA) is attached to the accommodation space 290, haze or other optical defects increase in the transparent area TA and thus the transmittance ratio decreases. Further, such a pressure sensitive adhesive (PSA) does not have sufficient adhesion force to attach the low reflective layer 280 in the narrow accommodation space, and does not have sufficient viscosity. Accordingly, it is difficult to process and implement. Even if a low reflective film including a pressure sensitive adhesive (PSA) is attached to the accommodation space 290, particles or bubbles may be present in the film. As a result, the appearance of the transparent area TA and the quality of the camera images may be significantly decreased. In contrast, an optically clear adhesive (OCA) has much better optical properties including transmittance ratio than a pressure sensitive adhesive (PSA) and exists in the gel-phase unlike a pressure sensitive adhesive (PSA), such that it can be easily attached in the narrow accommodation space 290. Accordingly, it is easier to process and implement. Therefore, the transparent adhesive layer 281 may be made of an optically clear adhesive (OCA) such that particles or bubbles are minimized between the substrate and the low reflective film 280 in the accommodation space.

The thickness of the transparent adhesive layer 281 may be within 10 µm to 40 µm, for example, within 15 µm to 25 µm. If the thickness of the transparent adhesive layer 281 is less than 10 µm, sufficient adhesion force cannot be obtained. If the thickness of the transparent adhesive layer 281 is greater than 40 µm, the optical properties of the transparent area TA decreases and it is difficult to attach in the accommodation space 290. In addition, it may deteriorate the surface characteristics after attaching.

The low reflective layer 282 is disposed under the transparent adhesive layer 281 and above the camera 240. The low reflective layer 282 minimizes glittering (or other undesirable optical affects) caused by the camera 240 or components thereof having a high reflectance. Specifically, the low reflective layer 282 may include a base film and a low refractive layer.

The base film supports the low reflective film 280. The low refractive layer is disposed on one surface of the base film, and the transparent adhesive layer 281 is disposed on the other surface thereof. The base film may be made of, but is not limited to, at least one selected from the group consisting of polyethylene terephthalate (PET), triacetyl cellulose (TAC), polypropylene (PP), polycarbonate (PC) and polyamide (PA).

The low refractive layer reduces the reflection of light caused by the camera 240 or its components and thus has a low refractive index or a reflective index. The reflective index of the low refractive layer can be between 1.0 to 1.4. If the reflective index of the low refractive layer is less than 1.0, the abrasion resistance of the low refractive layer may be greatly decreased. If the reflective index of the low refractive layer is greater than 1.4, it cannot effectively reduce the reflection of light caused by the camera 240. An acryl-based resin may be used for the low refractive layer. However, the low refractive layer may be made of any material as long as it has a sufficient transmittance and a low refractive index.

The thickness of the low reflective layer 282 may range from 15 µm to 50 µm. If the thickness of the low reflective layer 282 is less than 15 µm, reflection cannot be reduced sufficiently. If the thickness of the low reflective layer 282 is greater than 50 µm, the transmittance ratio and optical properties of the transparent area TA are decreased, such that image quality of the camera 240 can deteriorate.

Typically, components of the camera 240, such as a lens, are made of a highly reflective material. Accordingly, the light coming towards the camera 240 via the transparent area TA may be irregularly reflected by the components of the camera 240. When the camera 240 captures images, glittering caused by the light reflected off the camera 240 is perceived at a particular viewing angle. In view of the above, in the display device 200 according to an exemplary embodiment of the present disclosure, the low reflective film 280 includes the low refractive layer to reduce the reflectance of light, thereby minimizing such undesirable glittering. Specifically, the low reflective film 280 is in contact with the upper substrate 210 in the accommodation space 290, such that the reflection caused by camera 240 can be reduced and glittering can be minimized. Specifically, a 5° reflective Y value of the low reflective film 280 measured in the wavelength range from 380 nm to 780 nm may be 2.0% or less, and more specifically, 1.5% or less. In this regard, the 5° reflective Y value refers to luminous reflectance converted from the regular reflectance measured at the incident angle of 5°, which is perceived by human eyes. If the 5° reflective Y value of the low reflective film 280 is greater than 2.0%, the reflection cannot be reduced sufficiently.

In addition, the accommodation space 290 where the camera 240 is inserted has a narrow width, and thus it may be difficult to form a uniform coating layer in the accommodation space 290 by coating a low reflective material directly. Specifically, it is extremely difficult to adjust the thickness of the coating layer in the narrow accommodation space 290. Even if a coating layer is formed by coating, the coating layer cannot reduce the reflection sufficiently and has poor optical properties. To address such issues, the tape-type low reflective film 280 includes an optically clear adhesive to allow direct attachment in the accommodation space 290, such that glittering in the transparent area TA where the camera 240 is located can be effectively minimized.

As described above, the camera 240 is inserted in the accommodation space 290 to reduce the thickness of the display device 200 that is increased as the low reflective film 280 is disposed. In addition, the camera 240 is disposed below the transparent area TA in the non-display area NDA where the black matrix 260 is partially removed and is attached and secured to the lower frame 271 of the frame 270. The camera 240 may be spaced apart from the low reflective film 280 by a gap $d_3$ or may be in contact with the surface of the low reflective film 280 depending on the device specifications.

In the display device 200 according to the exemplary embodiment of the present disclosure, the camera 240 can be inserted in the accommodation space 290 in the lower substrate 230, and thus the thickness of the display device 200 can be significantly reduced compared to existing display devices. Accordingly, the display device 200 can become thinner. In addition, in the display device 200 according to the exemplary embodiment of the present disclosure, the low reflective film 280 is of a tape-type, and thus the low reflective film 280 can be easily disposed in the accommodation space 290 having a narrow diameter or width. Previously, a low reflective material was formed on the lower substrate 230 by performing a coating process, and thus a sufficiently large space was required. In contrast, by using the low reflective film 280 of a tape-type, it is possible to attach the low reflective film 280 in the narrow space, and thus the accommodation space can be small. Accordingly, the display device 200 with a narrow bezel can be manufactured. Therefore, the low reflective film 280 can be disposed in the narrow space without reducing the optical properties including the transmittance ratio with respect to the transparent area TA where the camera 240 is located. Further, by using the tape-type low reflective film 280, it is possible to minimize glittering caused by the reflection off the camera 240.

In some embodiments of the present disclosure, in the case that the display device 200 is an OLED device, the configurations of the upper substrate 210 and the lower substrate 230 may be altered. For example, in the case that the display device 200 is a bottom emission OLED device in which light emitted from an organic light-emitting element exists via an array substrate, the upper substrate 210 is an array substrate on which images are actually displayed. If an organic light-emitting element emits light of white, color filters, color refiners, or other color conversion means may be formed on the upper substrate 210. In this case, no thin film transistor or no color filter may be formed on the lower substrate 230, and the lower substrate 230 may work as a sealing element that protects the organic light-emitting element from moisture and oxygen. In the case that the display device 200 is a top emission OLED device in which light emitted from an organic light-emitting element exists away from an array substrate, the lower substrate 230 is configured as an array substrate. If an organic light-emitting element emits light of white, a color filter layer may be formed on the upper substrate 210.

Figure 3:
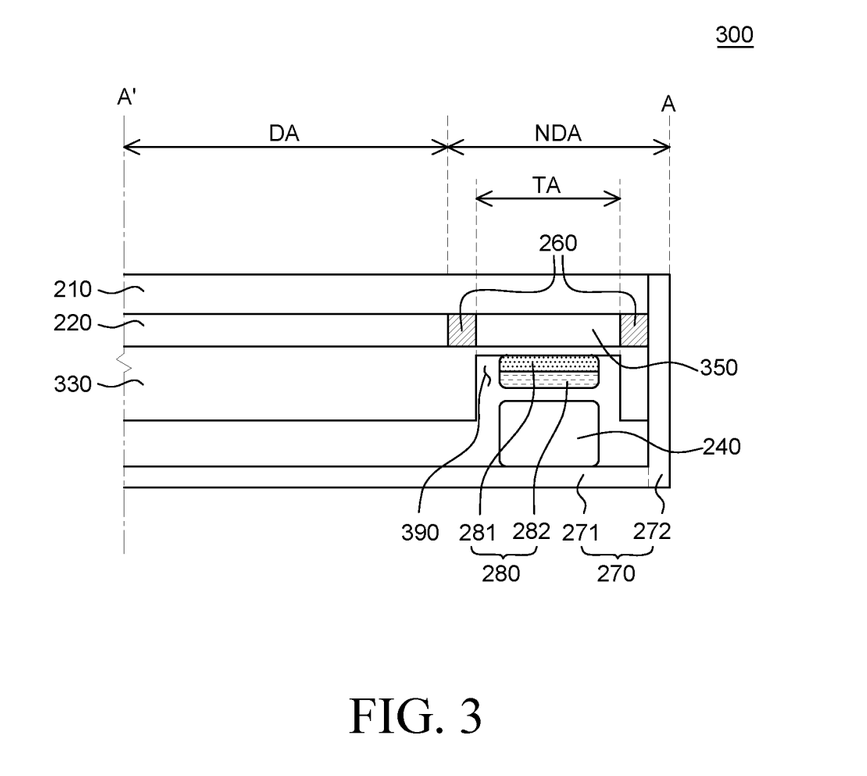
FIG. 3 is a cross-sectional view for illustrating a display device according to another exemplary embodiment of the present disclosure.

FIG. 3 is a cross-sectional view for illustrating a display device according to another exemplary embodiment of the present disclosure. A display device 300 shown in FIG. 3 includes a lower substrate 330, an upper substrate 210, a display element 220, a black matrix 260, an adhesive layer 350, an accommodation space 390, a low reflective film 280, a camera 240 and a frame 270. The display device 300 shown in FIG. 3 is substantially the same as the display device 200 shown in FIG. 2 except for the lower substrate 330, the adhesive layer 350 and the accommodation space 390. Therefore, redundant descriptions will be omitted or minimized.

Referring to FIG. 3, the accommodation space 390 is formed as a portion of the lower substrate 330 in the non-display area NDA is recessed from the bottom surface. That is, the accommodation space 390 may have a groove shape (or other recess structure) that is formed by hollowing out (or otherwise removing) a portion of the lower substrate 330 in the transparent area TA to a predetermined thickness. Unlike the accommodation space 290 of the display device 200 shown in FIG. 2, the accommodation space 390 of the display device 300 does not completely penetrate the lower substrate 330 but has a groove or recess shape at a thickness determined by device specifications.

Since the accommodation space 390 does not completely penetrate the lower substrate 330, the adhesive layer 350 is disposed between the lower substrate 330 and the upper substrate 210 in the non-display area NDA. In some embodiments of the present disclosure, empty space may exist between the upper substrate 210 and the lower substrate 330 in the transparent area TA without the adhesive layer 350.

As the accommodation space 390 may be a groove or recess shape formed in the lower substrate 330, the low reflective film 280 comes in contact with the bottom surface of the lower substrate 330 in the accommodation space 390. That is, a transparent adhesive of the low reflective film 280 contacts with the lower substrate 330.

In the display device 300 according to the exemplary embodiment of the present disclosure, the accommodation space 390 may be a groove or recess shape formed only in the lower substrate 330. Accordingly, if a panel including the upper substrate 210, the display element 220, the lower substrate 330 and the adhesive layer 350 is provided, it is possible to provide an accommodation space by forming a groove or recess at the lower substrate 330 for the low reflective film 280 and the camera 240.

Figure 4:
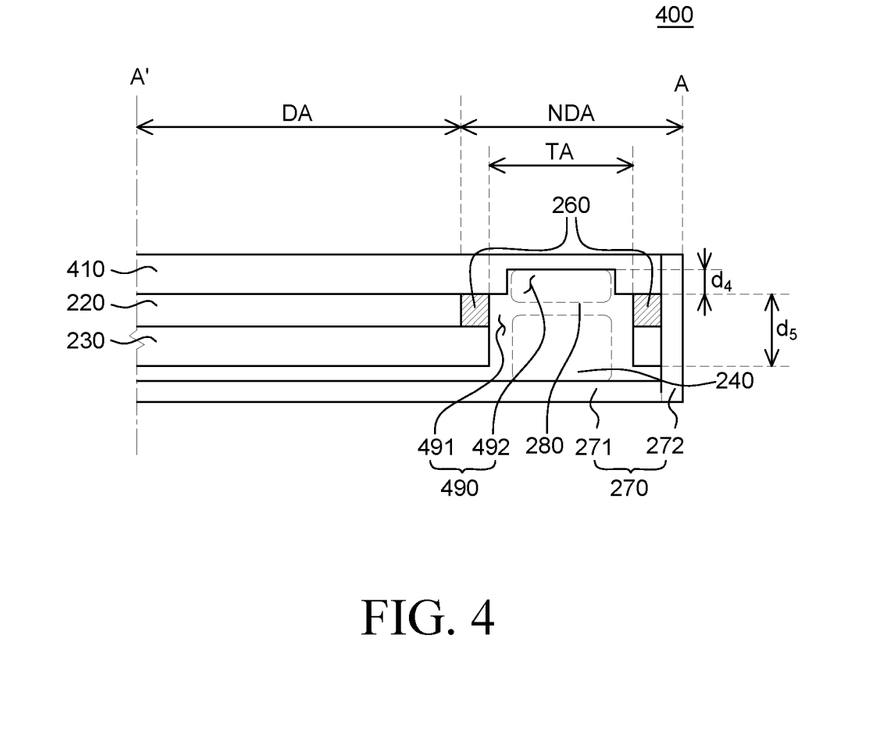
FIG. 4 is a cross-sectional view for illustrating a display device according to another exemplary embodiment of the present disclosure.

FIG. 4 is a cross-sectional view for illustrating a display device according to another exemplary embodiment of the present disclosure. A display device 400 shown in FIG. 4 includes a lower substrate 230, an upper substrate 410, a display element 220, a black matrix 260, an accommodation space 490, a low reflective film 280, a camera 240 and a frame 270. The display device 400 is substantially the same as the display device 200 shown in FIG. 2 except for the upper substrate 410 and the accommodation space 490. Therefore, redundant descriptions will be omitted or minimized. In FIG. 4, the reflective film 280 and the camera 240 are indicated by dashed lines for convenience of illustration.

Referring to FIG. 4, the display device 400 includes the accommodation space 490 in the non-display area NDA. That is, the accommodation space 490 is formed such that it is recessed from the bottom surface of the lower substrate 230 to at least a part of the upper substrate 410. That is, the accommodation space 490 completely penetrates the lower substrate 230 and also partially penetrates the upper substrate 410 so that at least a part of the camera can be further inserted therein. Specifically, the accommodation space 490 includes a first accommodation space 491 and a second accommodation space 492. The first accommodation space 491 is formed in the lower substrate 230 and has the depth of $d_5$ from the bottom surface of the lower substrate 230 to the bottom surface of the upper substrate 410. The first accommodation space 491 is substantially the same as the accommodation space 290 of the display device 200 shown in FIG. 2.

The second accommodation space 492 is formed in the upper substrate 410 by hollowing out or otherwise removing a portion from the bottom surface thereof to a predetermined thickness of $d_4$. The first accommodation space 491 and the second accommodation space 492 are connected to each other to form the accommodation space 490. That is, the accommodation space 490 has the depth from the bottom surface of the lower substrate 230 to the groove recessed at the upper substrate 410 at the predetermined thickness of $d_4$.

As the low reflective film 280 or at least a part of the camera 240 is inserted in the second accommodation space 492, the thickness of the display device 400 can be further reduced. That is, the second accommodation space 492 may be a variety of shapes such that it can accommodate the low reflective film 280 or at least a part of the camera 240.

Specifically, the first accommodation space 491 and the second accommodation space 492 may have the same width or diameter or may have different widths or diameters depending on device specifications. In FIG. 4, the width or the diameter of the second accommodation space 492 is shown as being smaller than that of the first accommodation space 491. In the example shown in FIG. 4, a part of the low reflective film 280 is inserted in the second accommodation space 492, and thus the thickness of the display device 400 can be reduced. In addition, a part of the camera 240 such as a lens protruding therefrom may be further inserted in the second accommodation space 492, such that the thickness of the display device 400 can be further reduced. That is, it is possible to form the accommodation space 490 to be appropriate for the structure and size of the camera and its components by adjusting the width or the diameter of each of the first accommodation space 491 and the second accommodation space 492.

In the display device 400 according to the exemplary embodiment of the present disclosure, the accommodation space 490 may be a recessed groove shape formed from the bottom surface of the lower substrate 230 to a portion of the upper substrate 410. Accordingly, the low reflective film 280 may contact with the upper substrate 410 in the second accommodation space 492. That is, a transparent adhesive of the low reflective film may contact with the upper substrate 410.

In the display device 400 according to the exemplary embodiment of the present disclosure, the accommodation space 490 includes not only the hole formed in the lower substrate 230 but also the groove recessed at the upper substrate 410, and thus the deeper accommodation space 490 can be provided. As a result, in the display device 400 according to the exemplary embodiment of the present disclosure, the camera 240 or the low reflective film 280 can be inserted in the accommodation space 490 more deeply, and thus the thickness of the display device 400 can be further reduced.

Figure 5:
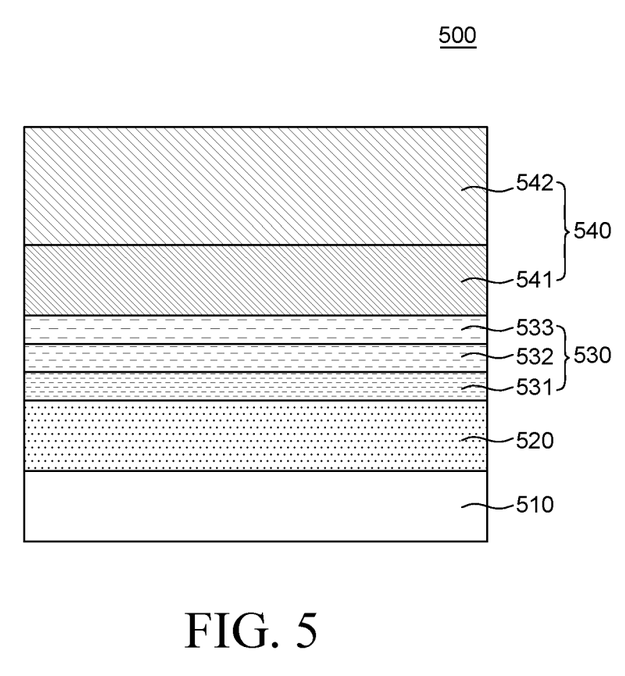
FIG. 5 is a cross-sectional view of a tape-type low reflective film used in a display device according to an exemplary embodiment of the present disclosure.

FIG. 5 is a cross-sectional view of a tape-type low reflective film used in a display device according to an exemplary embodiment of the present disclosure. FIG. 5 shows a tape-type low reflective film 500 before it is attached in an accommodation space.

Referring to FIG. 5, the tape-type low reflective film 500 includes a release film 510, a transparent adhesive layer 520, a low reflective layer 530, and a protect layer 540. The low reflective layer 530 includes a first base film 531, a first hard coating layer 532 and a low refractive layer 533. The protective layer 540 includes a second base film 541 and a second hard coating layer 542.

The release film 510 protects the transparent adhesive layer 520 and is removed before a process of attaching is performed, such that the transparent adhesive layer 520 becomes the outermost layer and is exposed to the outside.

The release film 510 may include, but is not limited to, polyolefin-based films such as polyethylene, polypropylene (PP), poly-1-butene, poly-4-methyl-1-pentene, ethylene-propylene copolymer, ethylene-1-butene copolymer, ethylene-acetic acid vinyl copolymers, ethylene-ethyl acrylate copolymer and ethylene-vinyl alcohol copolymer; polyester-based films such as polyethylene terephthalate (PET), polyethylene naphthalate and polybutylene terephthalate; polyamide-based film such as polyacrylates, polystyrene (PS), nylon-6 and partially aromatic polyamide (PA); polyvinyl chloride (PVC) film; polyvinylidene chloride film; and polycarbonate film or the like. The release film 510 may have an appropriate release surface treatment using a silicon-based or a fluorine-based compound. Typically, a polyethylene terephthalate (PET) film whose surface has been treated with a silicon-based compound may be frequently used as the release film 510.

The transparent adhesive layer 520 works as an adhesive to attach the low reflective film 500 to an intended position. The material and thickness of the transparent adhesive layer 520 is the same as those of the transparent adhesive layer 281 described above with reference to FIG. 2; and, therefore, will not be described again.

The low reflective layer 530 minimizes glittering caused by a camera having a high reflectance. The low reflective layer 530 includes the first base film 531, the first hard coating layer 532 and the low refractive layer 533.

The first base film 531 supports the low reflective film 500. The first hard coating layer 532 or the low refractive layer 533 is disposed on one surface of the first base film 531, and the transparent adhesive layer 520 is disposed on the other surface thereof. The material and the like of the first base film 531 are the same as those of the base film described above with reference to FIG. 2; and, therefore, will not be described again.

The hard coating layer 532 enhances the hardness of the low reflective film 500 and may be disposed between the first base film 531 and the low refractive layer 533. The first hard coating layer 532 may further include anti-ultraviolet light coating and anti-electrification feature. A certain feature may be added on the surface of the first hard coating layer 532 to further reduce reflections.

The low refractive layer 533 reduces the reflection of light cause by the camera or its components. The material and thickness of the low refractive layer 533 are the same as those of the low refractive layer described above with reference to FIG. 2; and, therefore, will not be described again.

The low reflective layer 530 may further include a high refractive layer on the low refractive layer 533 as desired. The refractive index of the high refractive layer has to be higher than that of the low refractive layer, such as from 1.6 to 1.8. By forming the high refractive layer on the low refractive layer, the reflection can be further reduced due to destructive interference of light.

The protective layer 540 is disposed on the low refractive layer 533 and protects the low reflective layer 530 from being scratched during the manufacturing process or during transporting of the tape-type low reflective film 500. The protective layer 540 is attached to the display device and then minimizes scratches occurring when the camera contacts with the low refractive layer 533 or due to particles in the low refractive layer 533.

After the tape-type low reflective film 500 is attached in the accommodation space, the protective layer 540 may remain on the low reflective layer 530 or may be removed in order to further reduce the thickness of the display device or minimize the transmittance ratio of the transparent area from decreasing.

The protective layer 540 may further include the second base film 541 and the second hard coating layer 542.

The second base film 541 of the protective layer 540 supports the second hard coating layer 542. The second base film 541 may be made of, but is not limited to, at least one selected from the group consisting of polyethylene terephthalate (PET), triacetyl cellulose (TAC), polypropylene (PP), polycarbonate (PC) and polyamide (PA). In the case that the protective layer 540 is later detached from the low reflective layer 530, interface treatment such as wax treatment, acryl treatment or urethane treatment may be performed between the protective layer 540 and the low reflective layer 530 such that the protective layer 540 is easily detached.

The second hard coating layer 542 that minimizes physical damage to the low reflective film 500, has high hardness and tensile strength. In addition, the second hard coating layer 542 has a low reflectance such that it may work as the low reflective film 500 in a subsequent process. The second hard coating layer 542 may be made of any material as long as the above-mentioned conditions are met. For example, the second hard coating layer 542 may be made of a silicon-based compound.

After the release film 510 is removed by a detaching mechanism, the tape-type low reflective film 500 is inserted in the accommodation space to be attached to the upper substrate or the lower substrate in the accommodation space. In addition, as described above, the attached protective layer 540 may be removed before or after the camera is inserted in the accommodation space, as desired. If the camera and the low reflective film contact each other, the protective layer 540 may not be removed to protect the low reflective layer 530 from the camera.

A variety of tests have been carried out on the display devices according to Example 1 of the present disclosure and Comparative Examples 1 and 2 to see the effects of the exemplary embodiments of the present disclosure. Results of such tests will be described below. The display device according to Example 1 has the structure shown in FIG. 2, and the low reflective film includes an optically clear adhesive (OCA) and a low reflective layer. As the low reflective layer, a film consisting of a TAC base film and a low refractive layer containing hollow silica particles (DSG03SC-60 produced by Dai Nippon Printing ("DNP") CO., Ltd. in Japan) was used. The display device according to Comparative Example 1 has the structure shown in FIG. 1B and thus it has no accommodation space and the camera is disposed under the lower substrate. The display device according to Comparative Example 2 is the same as the display device according to Example 1 except for that a low reflective film including a pressure sensitive adhesive (PSA) is used instead of an optically clear adhesive (OCA).

Test Examples (1) Measurement of 5° Reflective Y Value in Transparent Area

A black tape was attached on the transparent area of each of the display devices according to Example 1 and Comparative Examples 1 and 2, in order to minimize reflection off the rear surface. A spectrometer (CM-3600d, Konica Minolta, Inc.) was used as the surface of a low refractive layer, and 5° reflective Y value was measured in the wavelength range from 360 nm to 550 nm. Results are shown in the graph.

Figure 6:
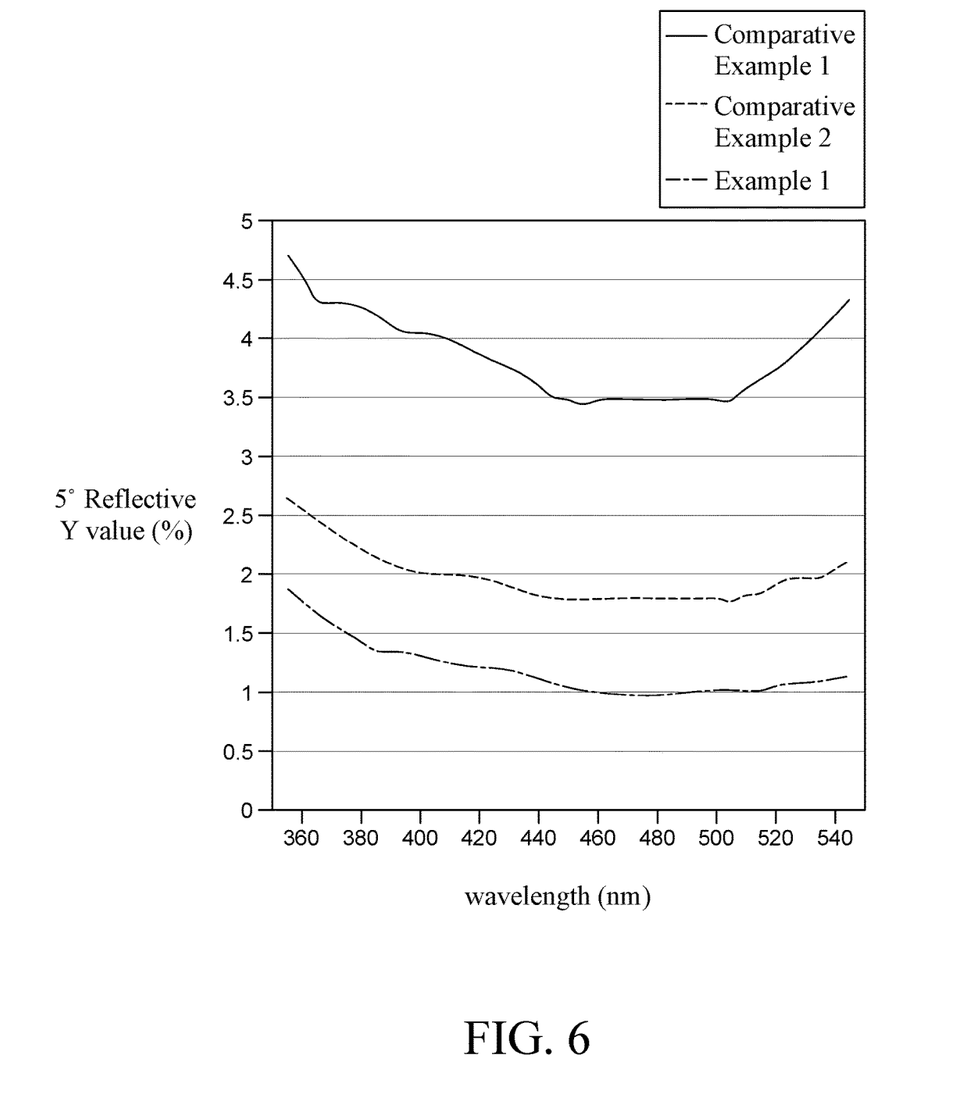
FIG. 6 is a graph for illustrating 5° reflective Y values of display devices according to an Example of the present disclosure and Comparative Examples.

Referring to FIG. 6, Comparative Example 1 in which no low reflective film is attached in the transparent area shows a 5° reflective Y value between 3.5% and 5%, and it cannot be expected that the reflection is reduced sufficiently. In contrast, Example 1 shows 5° reflective Y value between 1% and 2%. In addition, Example 1 shows a 5° reflective Y value which is much lower than that of Comparative Example 2, i.e., a 5° reflective Y value between 1.8% and 3%. Accordingly, it can be seen that Example 1 exhibits excellent effect of reducing the reflection.

(2) Measurement of Optical Properties of Transparent Area

The transparent areas of the display devices according to Example 1 and Comparative Example 2 were observed using a spectrophotometer (CM-3600d available from Konica Minolta Inc.) to measure transmittance ratio and haze. The results are shown Table 1.

TABLE 1

| Display Device | Transmittance (%) | Haze |
|---|---|---|
| Example 1 | 95.38 | 0.14 |
| Comparative Example 2 | 91.03 | 1.17 |

As can be seen from Table 1 that the transmittance ratio and haze of the transparent area of the display device according to Example 1 in which an optically clear adhesive (OCA) was used were better than those of Comparative Example 2 in which a pressure sensitive adhesive (PSA) was used. Accordingly, it can be seen that the display device according to Example 1 captures better images than the display device according to Comparative Example 2.

(3) Evaluation of Success Rate in Manufacturing Process and Appearance of Low Reflective Film The success rate in manufacturing processing was evaluated to see if the low reflective film is appropriately attached in the accommodation space during the manufacturing process each of the display devices according to Example 1 and Comparative Example 2. A process of attaching the low reflective film in the accommodation space having the diameter of 4 mm by using a film attaching mechanism was carried out ten times, and the rate that the low reflective film was successfully attached was calculated.

In addition, to evaluate the appearance of the transparent area of each of the display devices according to Example 1 and Comparative Example 2, 10 samples were prepared with the low reflective film produced according to the above method, and then the surfaces of the attached low reflective films were observed with an optical microscope, to measure amount of bubbles and amount of foreign matters. The results are shown in Table 2.

TABLE 2

| Display Device | Success Rate of Attaching (%) | Amount of Bubbles | Amount of Foreign Matter |
|---|---|---|---|
| Example 1 | 100 | — | — |
| Comparative Example 2 | 30 | Six Times | Three Times |

As can be seen from Table 2, the percentage of successful attaching was much higher in Example 1 than in Comparative Example 2. A pressure sensitive adhesive (PSA) used for the low reflective film in the related art has weak adhesion force and is difficult to attach in a narrow space. In contrast, according to Example 1 in which a gel-phase optically clear adhesive (OCA) is used, it is easy to attach in a narrow space, and thus Example 1 exhibits a much higher success rate in processing than Comparative Example 2. In addition, the display device according to Comparative Example 2 does not have sufficient adhesion force. So particles or bubbles may be between the substrate and the low reflective film. As a result, it can be seen that the appearance of the transparent area deteriorates.

The exemplary embodiments of the present disclosure can also be described as follows.

According to an aspect of the present disclosure, a display device includes a lower substrate, and an upper substrate above the lower substrate. The lower substrate has an accommodation space at a bottom surface thereof in a non-display area, the accommodation space configured to receive at least a portion of a camera therein. The upper substrate has a transparent area corresponding to the accommodation space of the lower substrate, and a low reflective film in the accommodation space to minimize glittering effects caused by light reflections caused by the camera.

The accommodation space may be configured to reduce a thickness of the display device by receiving the camera therein.

The accommodation space may completely penetrate the lower substrate and be extended to partially penetrate the upper substrate and at least a part of the camera is further received by the upper substrate.

The low reflective film may include a low reflective layer configured to minimize glittering, and a transparent adhesive configured to allow adhesion with at least one among the upper substrate and the lower substrate and, configured to maximize for a transmittance ratio with respect to the a transparent area above the camera.

The transparent adhesive may be an optically clear adhesive (OCA) that minimizes particles or bubbles between either the upper substrate or the lower substrate to which the transparent adhesive is attached and the low reflective film.

The low reflective film may further include a protective layer under the low reflective layer and the protective layer minimizes the low reflective layer from being damaged due to the camera being in contact with the low reflective layer.

According to another aspect of the present disclosure, there is provided a display device comprising a lower substrate having a recess in a non-display area, an upper substrate on the lower substrate, an anti-reflective film comprising a transparent adhesive layer attached to the upper substrate or the lower substrate in the recess at the lower substrate and a low reflective layer disposed under the transparent adhesive layer and a camera at least partially inserted in recess at the lower substrate and under the anti-reflective film. The display device can dispose an anti-reflective film in a narrow accommodation space, such that glittering possibly occurring at a particular viewing angle can be minimized.

The recess at the lower substrate may be either a groove at a bottom surface of the lower substrate or a hole penetrating the lower substrate.

The recess at the lower substrate may completely penetrate the lower substrate and be extended to partially penetrate the upper substrate.

The recess at the lower substrate may penetrate the lower substrate and be extended to a bottom surface of the upper substrate, and the upper substrate may be connected to the recess in the lower substrate and may have its own recess at the bottom surface of the upper substrate.

The width or diameter of the recess at the upper substrate may be equal to or less than the width or diameter of the recess at the lower substrate.

The thickness of the transparent adhesive layer may range from 10 μm to 40 μm.

The transparent adhesive layer may be an optically clear adhesive (OCA).

The anti-reflective film may further include a protective layer under the low reflective layer.

The protective layer may allow the camera to contact therewith.

Thus far, exemplary embodiments of the present disclosure have been described in detail with reference to the accompanying drawings. However, the present disclosure is not limited to the exemplary embodiments, and modifications and variations can be made thereto without departing from the technical idea of the present disclosure. Accordingly, the exemplary embodiments described herein are merely illustrative and are not intended to limit the scope of the present disclosure. The technical idea of the present disclosure is not limited by the exemplary embodiments. Therefore, it should be understood that the above-described embodiments are not limiting but illustrative in all aspects. The scope of protection sought by the present disclosure is defined by the appended claims and all equivalents thereof are construed to be within the true scope of the present disclosure.

What is claimed is:

1. A display device comprising:
   a lower substrate;
   an upper substrate above the lower substrate,
   wherein the lower substrate has an accommodation space at a bottom surface thereof in a non-display area, the accommodation space configured to receive at least a portion of a camera therein, and
   wherein the upper substrate has a transparent area corresponding to the accommodation space of the lower substrate; and
   a low reflective film attached to a bottom surface of the upper substrate in the accommodation space to minimize glittering effects caused by light reflections caused by the camera,
   wherein the low reflective film is of a tape-type,
   wherein the low reflective film includes a transparent adhesive layer attached to the bottom surface of the upper substrate, a low reflective layer disposed under the transparent adhesive layer, and a protective layer under the low reflective layer to protect the low reflective layer from the camera, and wherein the protective layer allows the camera to contact therewith.

2. The display device of claim 1, wherein the accommodation space is configured to reduce a thickness of the display device by receiving the camera therein.

3. The display device of claim 1, wherein the accommodation space completely penetrates the lower substrate.

4. The display device of claim 1, wherein
the low reflective layer is configured to minimize glittering; and
the transparent adhesive layer is configured to allow adhesion with the upper substrate, and is configured to maximize a transmittance ratio with respect to the transparent area above the camera.

5. The display device of claim 4, wherein the transparent adhesive layer is an optically clear adhesive (OCA) that minimizes particles or bubbles between the upper substrate to which the transparent adhesive layer is attached and the low reflective film.

6. The display device of claim 4, wherein the protective layer minimizes the low reflective layer from being damaged due to the camera being in contact with the low reflective layer.

7. A display device comprising:
a lower substrate having a recess in a non-display area;
an upper substrate on the lower substrate;
an anti-reflective film including a transparent adhesive layer attached to the upper substrate, a low reflective layer disposed under the transparent adhesive layer, and a protective layer under the low reflective layer; and
a camera at least partially inserted in the recess at the lower substrate and under the anti-reflective film,
wherein the anti-reflective film is of a tape-type and disposed in the recess, and
wherein the protective layer allows the camera to contact therewith.

8. The display device of claim 7, wherein the recess in the lower substrate is a hole penetrating the lower substrate.

9. The display device of claim 7, wherein the recess at the lower substrate penetrates the lower substrate and is extended to a bottom surface of the upper substrate, and
wherein the upper substrate is connected to the recess in the lower substrate.

10. The display device of claim 9, wherein a width or a diameter of the recess at the lower substrate is equal to or larger than a width or a diameter of the camera.

11. The display device of claim 7, wherein a thickness of the transparent adhesive layer ranges from 10 μm to 40 μm.

12. The display device of claim 7, wherein the transparent adhesive layer is an optically clear adhesive (OCA).

* * * * *